(12) United States Patent
Rusteberg

(10) Patent No.: US 8,409,043 B2
(45) Date of Patent: Apr. 2, 2013

(54) LUBRICATING DEVICE FOR A VARIABLE SPEED TRANSMISSION

(75) Inventor: Stefan Rusteberg, Isenbuettel (DE)

(73) Assignee: Audi AG, Ingolstadt (DE)

( * ) Notice: Subject to any disclaimer, the term of this patent is extended or adjusted under 35 U.S.C. 154(b) by 280 days.

(21) Appl. No.: 12/809,616

(22) PCT Filed: Dec. 17, 2008

(86) PCT No.: PCT/EP2008/010771
§ 371 (c)(1),
(2), (4) Date: Sep. 21, 2010

(87) PCT Pub. No.: WO2009/077174
PCT Pub. Date: Jun. 25, 2009

(65) Prior Publication Data
US 2011/0039651 A1  Feb. 17, 2011

(30) Foreign Application Priority Data
Dec. 19, 2007 (DE) .................... 10 2007 061 354

(51) Int. Cl.
*F16H 57/04* (2010.01)
(52) U.S. Cl. ........................................ 475/159
(58) Field of Classification Search ............ 475/159, 475/160, 206
See application file for complete search history.

(56) References Cited

U.S. PATENT DOCUMENTS

| 863,153 | A | * | 8/1907 | Coffman | 384/369 |
| 3,611,832 | A | * | 10/1971 | Vollmer | 475/198 |
| 3,627,390 | A | | 12/1971 | Irwin | |
| 4,736,819 | A | * | 4/1988 | Muller | 184/6.12 |
| 4,987,974 | A | * | 1/1991 | Crouch | 184/6.12 |
| 5,341,901 | A | * | 8/1994 | Mueller et al. | 184/6.12 |
| 6,780,135 | B2 | * | 8/2004 | Shibuya | 475/206 |
| 8,177,648 | B2 | * | 5/2012 | Gooden et al. | 464/7 |

FOREIGN PATENT DOCUMENTS

| DE | 3428865 C1 | 9/1985 |
| DE | 4117409 A1 | 12/1992 |
| DE | 10253416 A1 | 5/2004 |
| DE | 10315884 A1 | 11/2004 |
| DE | 102005006811 A1 | 9/2005 |
| DE | 102005052450 A1 | 6/2007 |
| JP | 2007211938 A | 8/2007 |

* cited by examiner

*Primary Examiner* — Dirk Wright
(74) *Attorney, Agent, or Firm* — Novak Druce Connolley Bove + Quigg LLP

(57) ABSTRACT

The invention relates to a lubricating device for a variable speed transmission with an integrated interaxle differential for motor vehicles, on the shaft of the transmission there being at least one synchronizer clutch for shifting one or two lower (slower) gear ratios and the interaxle differential, and the synchronizer clutch and the interaxle differential being supplied with lubricating oil by way of a central longitudinal channel in the shaft and by way of radial channels and/or radial gaps branching off from it. For improved adaptation of the lubricating oil supply in defined driving states of the motor vehicle, there are means which are integrated into the longitudinal channel and which change the lubricating oil supply to the synchronizer clutch and the interaxle differential as a function of the driving speed.

9 Claims, 3 Drawing Sheets

LUBRICATING DEVICE FOR A VARIABLE SPEED TRANSMISSION

The invention relates to a lubricating device for a variable speed transmission with an integrated interaxle differential for motor vehicles.

BACKGROUND OF THE INVENTION

These variable speed transmissions, which are also referred to as manually shifted transmissions, are known for all-wheel drives of motor vehicles. The supply of lubricating oil of the indicated synchronizer clutch and interaxle differential takes place, for instance, by a longitudinal channel which is located in the shaft or output shaft of the transmission and which supplies the lubricating sites with lubricating oil by way of radial channels and/or radial gaps, in particular, by centrifugal action. The dimensions of the radial channels and/or radial gaps are structurally fixed such that sufficient lubricating oil supply is always ensured while the motor vehicle is traveling.

The object of the invention is to propose a lubricating device of the generic type which ensures a lubricating oil supply which is adjusted even better to defined driving conditions using structurally simple means.

SUMMARY OF THE INVENTION

It is proposed according to the invention that the longitudinal channel integrates means which change the lubricating oil supply to the synchronizer clutch and the interaxle differential depending on the driving speed. The invention is based on the finding that for defined driving states a preferred lubrication of the synchronizer clutch and for other driving states a preferred lubrication of the interaxle differential are advantageous, and the lubricating oil supply which is mechanically dictated by the channel cross sections, etc., need not be increased by the indicated means. The means can be, for example, flaps, partitions, slides, etc., which are located in the longitudinal channel and which are controlled optionally electrically, electromechanically, or the like, by way of a driving speed signal.

It is, however, preferably suggested that the means are actuated by centrifugal force and thus function without any additional control effort.

The means can increasingly route lubricating oil to the synchronizer clutch at higher driving speeds and with the synchronizer clutch open. Here it was recognized that, as a result of the high differential rotational speed of the functional parts of the synchronizer clutch, at higher driving speed an increasing lubricating oil supply is advantageous and can reduce the wear of these functional parts, such as synchronizer rings, etc.

Preferably, the means can be formed by throttle elements which at least reduce the lubricating oil supply to the interaxle differential at higher driving speeds; at the same time this increases the lubricating oil supply to the synchronizer clutch at mechanically low cost. The reduced lubricating oil supply to the interaxle differential at higher driving speeds is harmless since, as has been recognized according to the invention, only very minor rotational speed differences or none at all occur in the functional parts of the differential, such as the balancing gears, etc., in these ranges. In the lower range of driving speeds, conversely, lubricating oil supply to the differential is unchoked, so that sufficient lubrication of the functional parts is ensured, for example, when the wheels of the motor vehicle are spinning.

The throttle elements downstream of the radial channels which branch off to the synchronizer clutch can be inserted into the longitudinal channel in a mechanically and functionally favorable arrangement and thus at higher driving speeds can at least reduce the flow cross section of the longitudinal channel more or less in a double function and at the same time increase the lubricating oil supply of the synchronizer clutch.

In a technically especially simple manner the throttle elements can be centrifugal weights which are elastically pretensioned into the position which largely clears the longitudinal channel and which are extended into the position which at least reduces the cross section of the longitudinal channel at a shaft speed which corresponds to a higher driving speed.

For this purpose, the centrifugal weights can be made in the shape of a segment of a circle in a favorable adaptation to the central longitudinal channel of the shaft, can be radially moved in an annular frame inserted into the longitudinal channel in radial guides, and can be kept in the retracted position by means of a common spring lock washer.

The centrifugal weights in the extended position can form a more or less continuous annular wall which reduces the diameter of the longitudinal channel and thus easily chokes the longitudinal channel or the lubricating oil supply to the interaxle differential.

Furthermore, there can preferably be four centrifugal weights which each cover approximately 90 degrees of the circumference of the longitudinal channel and which are movably guided in two crossing radial guides which lie in succession in the axial direction, such that they overlap in the retracted position for clearing a sufficient, radially outside annular cross section of the longitudinal channel.

Preferably, the synchronizer clutch can be a double synchronizer clutch for shifting the first and second gear ratio of the variable speed transmission. But in a corresponding arrangement a synchronizer clutch can also be lubricated as described above for shifting a reverse gear or third and fourth gear of the variable speed transmission. Finally, the interaxle differential can be a known, torque-sensing, self-locking differential or parallel axial differential.

DETAILED DESCRIPTION OF THE PREFERRED EMBODIMENTS OF THE INVENTION

Figure 1:
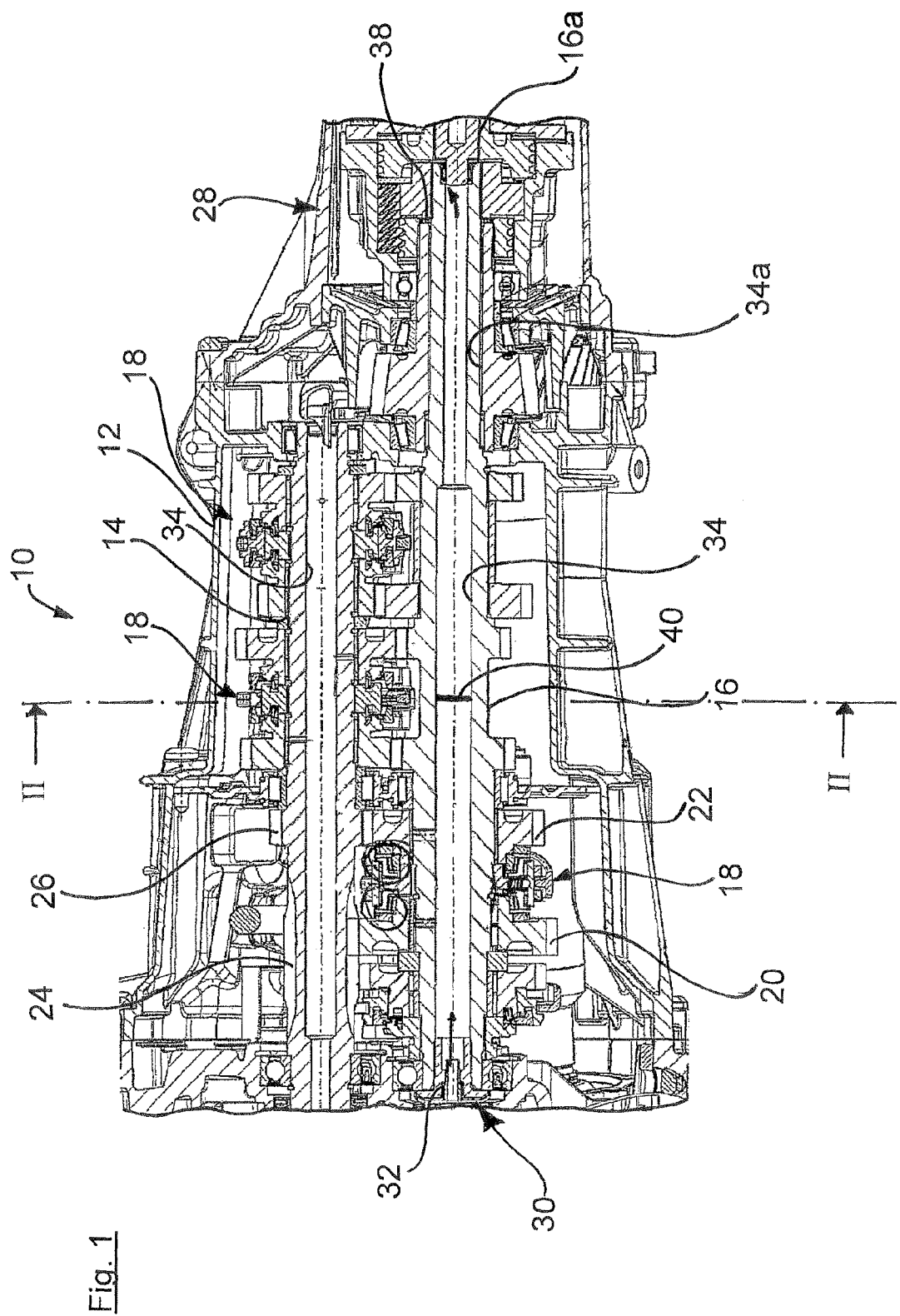
FIG. 1 shows a partial longitudinal section through a variable speed transmission with an integrated interaxle differential for motor vehicles and with a lubricating oil supply of a synchronizer clutch and of the differential, which supply is dependent on the driving speed.

The variable speed transmission 10 or manually shifted transmission shown only partially in FIG. 1 is only described to the extent that this is necessary for understanding this invention.

An input shaft 14 and an output shaft 16 located under it are pivoted in the housing 12 of the variable speed transmission 10 by way of the corresponding antifriction bearings (without reference numbers). On the input shaft 14 and output shaft 16 there are six intermeshing gears which form six forward and one reverse gear ratio and which can be shifted in alternation by way of double synchronizer clutches 18.

In detail, two free gears 20, 22 are pivoted on the output shaft 16 which mesh with stationary gears 24, 26 on the input shaft 14 and which are designed for shifting the first and second slow gear ratio, the clutch sleeve of the synchronizer clutch 18, which is located in between, being axially moved accordingly by way of a shifting device which is not shown. The double synchronizer clutch 18 is of conventional design and therefore is not further described.

An interaxle differential or self-locking TORSEN® differential 28 is permanently mounted on one face side at 16a of the output shaft 16 and outputs to a front and a rear axle differential for driving the front and rear wheels of the motor vehicle in a manner which is not shown. The TORSEN® differential 28 is likewise of conventional design and is not further described.

The variable speed transmission 10 has a lubricating device via which the antifriction bearing, the gears, the synchronizer clutches 18, the TORSEN® differential 28, and all transmission components which require lubricating oil supply can be lubricated.

The lubricating oil device also collects the lubricating oil which has been thrown off the transmission components from the lubricating oil sump of the variable speed transmission 10 by way of capture means 30 which are only partially shown and routes it conventionally by way of supply pipes 32 among others into the central longitudinal channels 34 in the input shaft 14 and the output shaft 16.

The branch of the lubricating device of the variable speed transmission 10 which relates to the output shaft 16 with the free gears 20, 22 and the TORSEN® differential 28 is described below.

For this purpose several radial channels 36 branch off from the longitudinal channel 34 of the output shaft 16 and ensure lubricating oil supply of the free gears 20, 22 and the double synchronizer clutch 18. As the output shaft 16 turns, the lubricating oil which is delivered into the longitudinal channel 34 is forced by centrifugal action into the corresponding bearing sites and through the synchronizer rings (not shown) of the synchronizer clutch 18.

The longitudinal channel 34 which extends as far as the face side 16a of the output shaft 16 moreover has a fluid connection to the functional parts of the TORSEN® differential 28 by way of a radial gap 38 machined on the face side 16a so that lubricating oil is furthermore forced out of the longitudinal channel 34 into the TORSEN® differential 28 by way of this radial gap 38 (there can also be several radial gaps 38) and by centrifugal action. The longitudinal channel 34 can have a section 34a which is partially reduced in diameter, as is shown.

Proceeding from the lubricating oil supply on the left side of FIG. 1 by way of the supply pipe 32 which projects into the longitudinal channel 34, downstream of the radial channels 36 means 40 (only suggested in FIG. 1) are inserted into the longitudinal channel 34 and reduce the lubricating oil supply to the TORSEN® differential 28 actuated by centrifugal force at higher speed of the output shaft 16 which is proportional to the driving speed of the motor vehicle, and thus at the same time cause increased lubricating oil supply of the free gears 20, 22 and the double synchronizer clutch 18.

Figure 3:
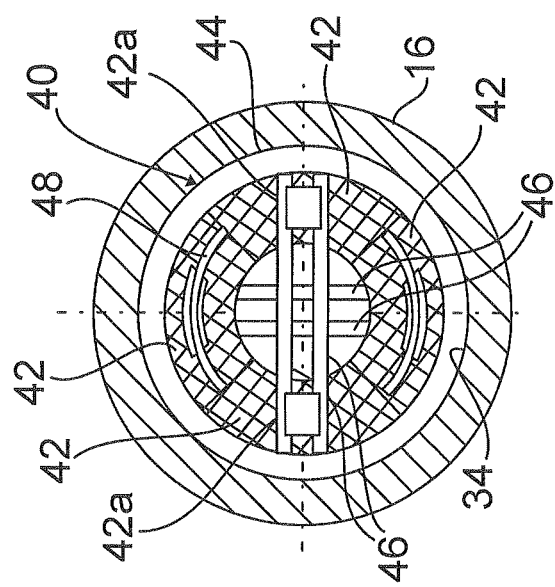
FIG. 3 shows the throttle elements as shown in FIG. 2 in the extended, throttling position.
Figure 2:
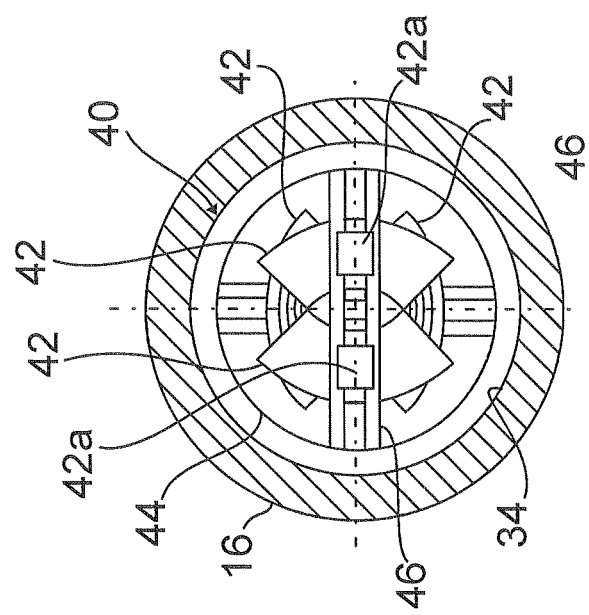
FIG. 2 shows a cross section along line of FIG. 1 through the shaft of the variable speed transmission with a central longitudinal channel and through the inserted throttle elements, on an enlarged scale, the throttle elements being shown in the retracted position.
Figure 4:
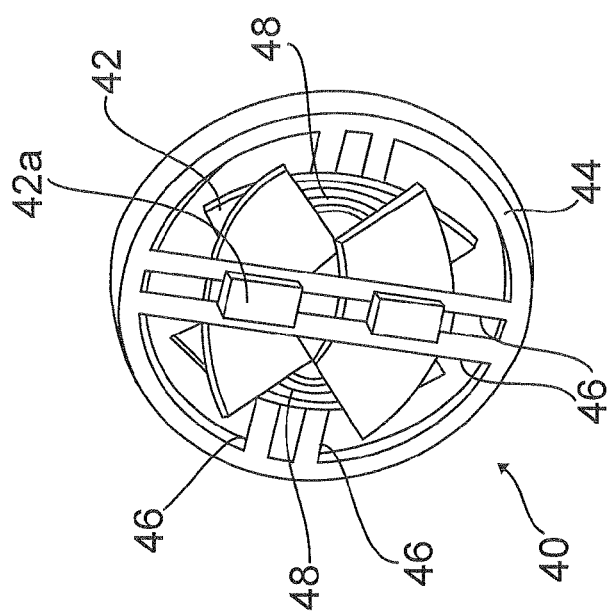
FIG. 4 shows the throttle elements as shown in FIG. 2 in a three-dimensional representation and in the retracted position.

The means 40 as shown in FIGS. 2 to 4 are formed by four centrifugal weights 42 which act as throttle elements and have the shape of the segment of a circle, which weights extend over a periphery of 90 degrees and are elastically pretensioned radially to the inside into a position which largely clears the longitudinal channel 34 (FIGS. 2 and 4) and which are extended into the position which reduces the inside cross section of the longitudinal channel 34 (FIGS. 3 and 5) at the speed of the output shaft 16 which correspond to a higher driving speed.

The centrifugal weights 42 are guided to be able to move radially by way of guide journals 42a in an annular frame 44 inserted into the longitudinal channel 34 in web-shaped radial guides 46 which have guide slots and are held in the retracted position by means of a common, peripheral spring lock washer 48 (shown only partially). The frame 44 with the radial guides 46 is made of plastic, while the spring lock washer 48 is a rubber ring made with defined pretensioning, and the centrifugal weights 42 are made of steel. The plastic-steel material pair is, however, not essential and can be replaced by other suitable material pairs.

In the extended position (FIGS. 3 and 5), the four centrifugal weights 42, as is to be seen, form an annular wall which adjoins the wall of the longitudinal channel 34, which is more or less continuous, and which reduces the inside cross section of the longitudinal channel 34 (emphasized by the cross-hatching in FIG. 3).

Figure 5:
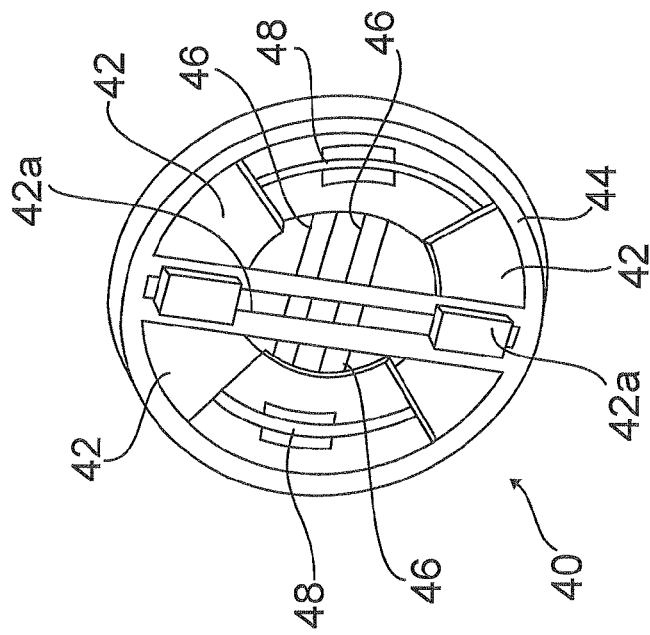
FIG. 5 shows the throttle elements as shown in FIG. 3 in a likewise three-dimensional representation and in the extended throttling position.

The centrifugal weights 42 in the retracted position can overlap to clear a sufficient inside ring cross section of the longitudinal channel 34 by the crossing radial guides 46 of the centrifugal weights 42 and by their arrangement in succession in the axial direction (cf. three-dimensional representations in FIGS. 4 and 5). It goes without saying that the annular frame 44 also forms a certain constriction of the longitudinal channel 34 which, however, can be taken into account structurally by the corresponding layout of the longitudinal channel 34 in the output shaft 16.

At a lower driving speed of the motor vehicle with correspondingly lower speed of the output shaft 16, for example, with the double synchronizer clutch 18 shifted into the first or second gear ratio, the centrifugal weights 42 as throttle elements are in the retracted position as shown in FIGS. 2 and 4.

Accordingly, between the centrifugal weights 42 and the frame 44 or the wall of the longitudinal channel 34, an annular passage is formed which also ensures sufficient lubricating oil supply to the functional parts of the TORSEN® differential 28 for lubrication of the free gears 20, 22 and the synchronizer clutch 18 by way of radial channels 36. Here the lubricating oil which has been supplied by way of the supply pipe 32 as a result of the turning output shaft 16 flows cylindrically along the wall of the longitudinal channel 34 and is distributed by centrifugal action into the radial channels 36 and the radial gap 38.

As the driving speed of the motor vehicle increases beyond the gear layout of the first and second gear ratio and according to the increasing speed of the output shaft 16, the centrifugal weights 42 are extended radially to the outside and finally form the described annular wall (FIG. 3, crosshatched region) which accordingly reduces the cylindrical lubricating oil supply to the TORSEN® differential 28. Moreover, the lubricating oil supply of the free gears 20, 22 and the double synchronizer clutch 18, which is not actively shifted at this time is increased.

Thus, by installing the means 40 or the throttle elements 42, a variable lubricating oil supply of the variable speed transmission 10 with an integrated self-locking TORSEN® differential is formed which takes into account the actual demands on sufficient lubricating oil supply depending on the driving speed of the motor vehicle to an increased degree; at lower driving speeds the supplied lubricating oil flow is divided into a mechanically dictated partial amounts, while at higher driving speeds the lubricating oil supply of the TORSEN® differential 28 is reduced and the lubricating, oil supply of the synchronizer clutch 18 is increased.

The invention is not limited to the illustrated exemplary embodiment. Instead of the described centrifugal weights 42, other throttle elements can also be used as means 40, for example, deflectable flaps, partitions, electrically or electromechanically controllable valves, etc. The spring can be a helical compression spring, helical tension spring, or the like, in contrast to the illustrated rubber ring.

Instead of two gear ratios with gears 20, 24 and 22, 26, other gear ratios, for example, the reverse gear, can be incorporated into the variable lubricating oil supply.

The interaxle differential 28 can also be a bevel differential gear, a planetary gear differential, or parallel axis differential which is integrated accordingly into the variable speed transmission 10.

The invention claimed is:

1. A fluid supply device comprising:
a shaft provided with an axial passageway, rotatable about the axis thereof, having a fluid inlet port, a first fluid output port and at least one second fluid outlet port disposed between said fluid inlet port and said first fluid outlet port; and
means disposed between said first and second outlet ports radially displaceable responsive to centrifugal force produced responsive to the rotation of said shaft, for correspondingly varying a cross-sectional area of an opening therethrough in said passageway.

2. A device according to claim 1 wherein said means for varying said cross-sectional area comprises sets of diametrically opposed weighted elements, relative said axis.

3. A device according to claim 2 wherein each of said weighted elements has a configuration of a segment of a circle.

4. A device according to claim 3 wherein each of said segments has a 90° arcuate span.

5. A device according to claim 2 including means for guiding said weighted elements radially relative to said axis.

6. A device according to claim 2 including means for biasing said elements toward said axis.

7. A device according to claim 2 wherein said first outlet port communicates with an interaxle differential of a variable speed transmission of a motor vehicle consisting of one of a TORSEN® differential, a bevel differential gear, a planetary gear differential and a parallel axis differential.

8. A device according to claim 2 wherein said second output port communicates with one of a gear and a synchronizer clutch of a variable speed transmission of a motor vehicle.

9. A device according to claim 1 wherein said means for varying the cross-sectional area of an opening in said passageway comprises a valve actuated by centrifugal force.

* * * * *